3,351,649
PENTAERYTHRITOL ARSENITE SUBSTITUTED BENZOATES
Marcel A. Gradsten, Demarest, N.J., assignor to Tenneco Chemicals, Inc., New York, N.Y., a corporation of Delaware
No Drawing. Filed Apr. 13, 1965, Ser. No. 447,898
3 Claims. (Cl. 260—440)

This invention relates to pentaerythritol arsenite esters and to the use of these compounds in the control or inhibition of plant growth.

In accordance with this invention, it has been discovered that certain pentaerythritol arsenite chlorobenzoates have unusual and valuable activity as selective herbicides. These esters have the structural formula

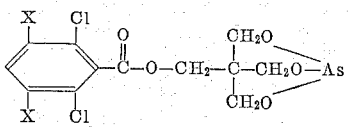

wherein each X represents hydrogen, chlorine, lower alkyl, lower alkoxy, nitro, or amino. Illustrative of these compounds are the following: pentaerythritol arsenite 2,6-dichlorobenzoate, pentaerythritol arsenite 2,3,6-trichlorobenzoate, pentaerythritol arsenite, 2,6-dichloro-3-methylbenzoate, pentaerythritol arsenite 2,6-dichloro-3-butylbenzoate, pentaerythritol arsenite 2,6-dichloro-3-methoxybenzoate, pentaerythritol arsenite 2,6-dichloro-3-butoxybenzoate, pentaerythritol arsenite 2,6-dichloro-3-nitrobenzoate, pentaerythritol arsenite 2,6-dichloro-3-aminobenzoate, pentaerythritol arsenite 2,3,5,6-tetrachlorobenzoate, pentaerythritol arsenite 2,3,6-trichloro-5-nitrobenzoate, pentaerythritol arsenite 2,3,6-trichloro-5-aminobenzoate, pentaerythritol arsenite 2,6-dichloro-3-nitro-5-aminobenzoate, and pentaerythritol arsenite 2,6-dichloro-3,5-dinitrobenzoate. The preferred compounds for use as selective herbicides are those in which the X substituents represent hydrogen and/or chlorine, that is, pentaerythritol arsenite 2,6-dichlorobenzoate, pentaerythritol arsenite 2,3,6-trichlorobenzoate, and pentaerythritol arsenite 2,3,5,6-tetrachlorobenzoate.

The novel compounds of this invention may be prepared by any convenient procedure. One procedure that has given excellent results involves the reaction of pentaerythritol with arsenic trioxide to form pentaerythritol arsenite, $HOCH_2$—$C(CH_2O)_3As$, and the subsequent reaction of the pentaerythritol arsenite with the appropriate chlorobenzoyl chloride.

The pentaerythritol arsenite chlorobenzoates of the present invention have a spectrum of selective herbicidal activity that is different from that of the chlorobenzoic acids having the same substituents and from that of any of the previously known esters and salts of these acids. The reason for this difference in activity is not now known. One possible explanation for the unusual selective herbicidal activity of the novel esters is that under the conditions of their use the esters are hydrolyzed to form pentaerythritol monochlorobenzoate and arsenic trioxide that may act synergistically to produce the unexpected selective herbicidal effect.

The pentaerythritol arsenite chlorobenzoates may be applied to a wide variety of plants to control or inhibit their growth. They are of particular value in the control of weeds in an area containing a crop.

These esters may, if desired, be applied as such to the locus or to the plants to be treated. Ordinarily and preferably, however, they are used in combination with an inert diluent or carrier to make it easier to measure accurately and to apply evenly the small amounts of the compounds that are required to control plant growth as well as to apply them in a form that will be readily dispersed through the soil and/or absorbed by the plants. These compounds can be mixed with or deposited upon finely-divided inert particulate solids, such as fullers earth, talc, diatomaceous earth, natural clay, kaolin, walnut shell flour, and the like, to form dry particulate compositions. Such compositions may be employed as dusts, or they may be dispersed in water with or without the aid of a surface-active agent. Alternatively, the dry compositions may be formed into granules or pellets by known techniques.

The pentaerythritol arsenite chlorobenzoates are preferably dispensed in the form of solutions or dispersions in inert organic solvents, in water, or in mixtures of inert organic solvents and water. The solvents that may be used include the aliphatic and aromatic hydrocarbons, ketones, alcohols, and ethers that are ordinarily employed in herbicidal compositions, for example, toluene, xylene, naphtha, mineral spirits, acetone, methyl ethyl ketone, isopropanol, dioxane, and mixtures thereof.

The concentration of the herbicidal esters in the compositions may vary within wide limits and depends upon a number of factors, among the most important of which are the amount of the composition to be applied per unit of area and the type or types of plants being treated. In most cases the herbicidal compositions are applied in the form of sprays, dusts, or granules that contain from about 0.1% to 80% by weight of the active component. Other herbicidal compounds may also be present in the herbicidal compositions. The amount of the herbicidal compositions applied is generally that which will provide approximately 1 pound to 20 pounds of the pentaerythritol arsenite chlorobenzoate per acre.

This invention is further illustrated by the examples that follow.

EXAMPLE 1

*Pentaerythritol arsenite 2,6-dichlorobenzoate*

Pentaerythritol arensite was prepared by heating 54.5 grams (0.4 mole) of pentaerythritol with 39.6 grams (0.2 mole) of arsenic trioxide. The mixture began to melt at 80° C., and water started to distill from the reaction vessel when the temperature reached 120° C. The mixture was heated rapidly to 230° C. and then allowed to cool. There was obtained 80 grams of pentaerythritol arsenite, which melted at 105°–108.5° C.

To a solution of 31.2 grams (0.15 mole) of pentaerythritol arsenite in 60 grams of pyridine was added 31.5 grams (0.15 mole) of 2,6-dichlorobenzoyl chloride over a period of 45 minutes. During the first seven minutes of the addition the temperature of the mixture rose to 45° C. External heating was required to maintain the temperature of the mixture at 40–50° C. for 4 hours. Following removal of the pyridine by distillation, the residue was washed with 150 ml. of cold methanol and then with two 25 ml. portions of cold ether. After drying there was obtained 29 grams of pentaerythritol arsenate 2,6-dichlorobenzoate, which melted at 135.5°–138.5° C. The product contained 17.95% Cl (calculated for $$C_{12}H_{11}Cl_2O_5As$$

18.65% Cl).

EXAMPLE 2

*Pentaerythritol arsenite 2,3,6-trichlorobenzoate*

To a solution of 31.2 grams (0.15 mole) of pentaerythritol arsenite in 60 grams of pyridine was added 38.5 grams (0.15 mole) of 2,3,6-trichlorobenzoyl chloride over a period of 43 minutes. During the first nine minutes of the addition the temperature of the mixture rose to 46° C. External heating was required to maintain the temperature of the mixture at 40°–50° C. for 4 hours. Following removal of the pyridine by distillation, the residue was washed with 150 ml. of cold methanol and then with two 25 ml. portions of cold ether. After drying there was obtained 50 grams of pentaerythritol arsenite 2,3,6-trichlorobenzoate, which melted at 183.5°–187° C. The product contained 25.6% Cl (calculated for $$C_{12}H_{10}Cl_3O_5As$$

25.6% Cl).

EXAMPLE 3

Groups of greenhouse flats containing soil were planted with seeds of various representative plant species. In the pre-emergence tests, the flats were sprayed with a 0.3% aqueous dispersion of a pentaerythritol arsenite chlorobenzoate. In the postemergence tests, the plants were sprayed with the same herbicidal dispersion 2 to 4 weeks after planting. The dispersion was applied to the soil or to the plants at the rate that would apply 10 pounds of the herbicidal ester per acre. In each case the results were observed 2 weeks after the application of the herbicidal composition.

In the table that follows, the effectiveness of the herbicidal ester, as determined by comparison with untreated plantings, is indicated by the numbers "0" through "10" in increasing order of effectiveness. Thus "0" indicates no herbicidal effect; "1" to "3," slight injury; "4" to "6," moderate injury; "7" to "9," severe injury; and "10," destruction of all plants.

HERBICIDAL ACTIVITY OF PENTAERYTHRITOL ARSENITE CHLOROBENZOATES AT 10 LBS./ACRE

| Plant Species | Pentaerythritol Arsenite 2,6-Dichlorobenzoate | | Pentaerythritol Arsenite 2,3,6-Trichlorobenzoate | |
|---|---|---|---|---|
| | Pre-emergence | Post-emergence | Pre-emergence | Post-emergence |
| Corn | 0 | 0 | 0 | 4 |
| Clover | 0 | 10 | | |
| Wheat | 0 | 5 | 0 | 8 |
| Oats | 0 | 10 | 0 | 8 |
| Soybeans | 0 | 10 | 8 | 10 |
| Mustard | 10 | 10 | 10 | 10 |
| Morning Glory | 0 | 1 | 8 | 10 |
| Buckwheat | 10 | 10 | 0 | 10 |
| Crabgrass | 0 | 0 | 5 | 0 |

Each of the other pentaerythritol arsenite chlorobenzoates of this invention can be used in a similar way to control or inhibit the growth of a variety of monocotyledonous and dicotyledonous plants.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A compound having the structure

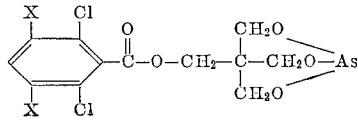

wherein each X represents a member selected from the group consisting of hydrogen, chlorine, lower alkyl, lower alkoxy, nitro, and amino.

2. Pentaerythritol arsenite 2,6-dichlorobenzoate.
3. Pentaerythritol arsenite 2,3,6-trichlorobenzoate.

No references cited.

TOBIAS E. LEVOW, *Primary Examiner.*

W. F. W. BELLAMY, *Assistant Examiner.*